US009152645B2

(12) United States Patent
Itabashi et al.

(10) Patent No.: US 9,152,645 B2
(45) Date of Patent: Oct. 6, 2015

(54) DISTRIBUTED OBJECT MANAGEMENT SYSTEM, DISTRIBUTED OBJECT MANAGEMENT SERVER, DISTRIBUTED OBJECT MANAGEMENT METHOD AND COMPUTER PROGRAM OF THE SAME

(75) Inventors: Yasuo Itabashi, Tokyo (JP); Kinichi Sugimoto, Tokyo (JP); Yoshiaki Sakae, Tokyo (JP); Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 13/258,863

(22) PCT Filed: Mar. 25, 2010

(86) PCT No.: PCT/JP2010/002146
§ 371 (c)(1),
(2), (4) Date: Sep. 22, 2011

(87) PCT Pub. No.: WO2010/109886
PCT Pub. Date: Sep. 30, 2010

(65) Prior Publication Data
US 2012/0016969 A1 Jan. 19, 2012

(30) Foreign Application Priority Data
Mar. 27, 2009 (JP) ................. P2009-078781

(51) Int. Cl.
G06F 15/16 (2006.01)
G06F 17/30 (2006.01)
H04L 29/08 (2006.01)
G06F 3/06 (2006.01)

(52) U.S. Cl.
CPC ...... *G06F 17/30194* (2013.01); *H04L 67/1097* (2013.01); *G06F 3/067* (2013.01)

(58) Field of Classification Search
USPC .................. 709/217, 219; 711/133
See application file for complete search history.

(56) References Cited

U.S. PATENT DOCUMENTS 7,127,496 B2 * 10/2006 Isozu et al. ................. 709/217
7,266,645 B2 * 9/2007 Garg et al. ................. 711/133
7,995,618 B1 * 8/2011 Bjerregaard ............... 370/503

FOREIGN PATENT DOCUMENTS

JP 11-238011 A 8/1999
JP 2000285031 A 10/2000
JP 2005293325 A 10/2005

OTHER PUBLICATIONS

International Search Report for PCT/JP2010/002146 mailed May 25, 2010.
"Dolly+". <Internet>, [retrieved Sep. 2011], http://CORVUS.kek.jp/~manabe/pcf/dolly/index_J.htm.
A. S. Tanenbaum et al., "Distributed Systems: Principles and Paradigms". Pearson Education Japan, 2003, pp. 347-349.
M. Ichien et al., "Implementation of Chunk Placement Strategy and Preliminary Evaluation of Cluster Storage for Large-Scale Content Distribution Service", IEICE Technical Report, vol. 108, No. 180, CPSY2008-17, 2008, pp. 37-42.

* cited by examiner

Primary Examiner — Michael Won
Assistant Examiner — Karina J Garcia-Ching
(74) Attorney, Agent, or Firm — Sughrue Mion, PLLC

(57) ABSTRACT

A distributed object management system includes: a completion information management portion which stores a relay state of the object server and which manages information of the object which should be transmitted again when the transmission to the object server is resumed; and a relay control portion which requests other object server to temporally exclude the object server that has transmitted the suspension request from a copying operation of the object and which, if the resume request is received from the object server that has transmitted the suspension request, requests said other object server to include the object server that has transmitted the resume request in the copying operation of the object again.

7 Claims, 17 Drawing Sheets

DISTRIBUTED OBJECT MANAGEMENT SYSTEM, DISTRIBUTED OBJECT MANAGEMENT SERVER, DISTRIBUTED OBJECT MANAGEMENT METHOD AND COMPUTER PROGRAM OF THE SAME

TECHNICAL FIELD

The present invention relates to a distributed object management system, a distributed object management server, a distributed object management method and a computer program.

Priority is claimed on Japanese Patent Application No. 2009-078781, filed in Mar. 27, 2009, the content of which is incorporated herein by reference.

BACKGROUND ART

A copying operation is necessary in a large volume object transmission operation of, for example, a hosting service to improve reliability and access response. For example, a client terminal or an object server which receives a write request from the client terminal transmits the write request to other multiple object servers in parallel.

FIG. 25 is an outline drawing showing a device constitution of a distributed object system 700.

The distributed object system 700 is a system in which objects transmitted from a client terminal 710 is copied by object servers 720a-720c.

In the distributed object system 700, a network band is shared by the object servers 720a-720c, and therefore, the network band can be a bottleneck with regard to a speed of writing the objects into object databases by the object servers 720a-720c.

FIG. 26 is an outline drawing showing other device constitution including a distributed object system 800.

In the distributed object system 800 shown in FIG. 26, object servers 810a-810c are constituted so as to sequentially transmit/relay an object, and a pipelining operation is applied to each of object servers 810a-810c in that a parallel operation is conducted including a reading operation of an object transmitted via a network, a writing operation of the object into a database and a transmission operation to the following object server. In such a manner, the distributed object system 800 shares a network band between multiple object servers and prevents the formation of a bottleneck.

FIG. 27 is an outline drawing showing a device constitution of a distributed object system 900 other than the above.

As a technique of the art, Dolly+ shown in FIG. 27 is introduced. In a pipelining operation of Dolly+ in which an object is copied between multiple object servers, FIG. 27 shows an operation and constitution in that an object server which has a problem is removed from targets of the copying operation.

PRIOR ART DOCUMENTS

Patent Documents

Patent document 1: Japanese Patent Application, First Publication No. H11-238011
Patent document 2: Japanese Patent Application, First Publication No. 2005-293325

Non-patent Documents

Non-patent Document 1: "Dolly+" http://CORVUS.kek.jp/~manabe/pcf/dolly/index_J.htm (accessible in 2009 Feb. 24)

Non-patent Document 2: "Distributed Systems: Principles and Paradigms" (Andrew S. Tanenbaum et al, PEARSON Education, Tokyo, 2003), pp. 347

DISCLOSURE OF INVENTION

However, in the object server which is constituted so as to sequentially transmit/relay the object, when both the writing operation on the object database and the transmission operation to the following object server are conducted in parallel, the object is transmitted to the following object server while a writing operation on the object database is not completed. In such a case, in general, there is a limitation of an amount of data to the object database, for example, a buffer of a main memory device. Therefore, with regard to an excess amount over a write buffer provided by the object server, it is necessary to wait until the end of the writing operation on the object database, and there is a problem in which a delay caused by such a waiting operation propagates across all object servers which are sequentially arranged.

Further, in a pipeline operation of Dolly+, there are not both means for detecting successful results of generation of copies, at the object servers and means for transmitting information to a client terminal for notifying successful results of a copying operation. Therefore, when the object servers which are sequentially constituted conduct both the writing operation on the object databases and the transmission operation to the following object servers in parallel, there is a problem in which it is not possible to control or manage a tradeoff relationship between a performance and reliability by monitoring a state of generating copies of the object data.

The present invention is conceived in consideration of the above-described problems and has an object to provide a distributed object management system, a distributed object management server, a distributed object management method and a computer program that can reduce delay of copying an object and that can reduce the waiting time of a client terminal, if necessary.

The present invention has, for example, solutions shown below to resolve the above-described problems.

A solution is a distributed object management system including: a client terminal transmitting an object; an object server copying the object; and a distributed object management server communicating with the client and said plurality of object servers, wherein the client terminal includes a relay control portion which transmits the object to the object servers, the object servers include: a storage portion storing the object; a write control portion writing the object received from the client terminal or other object servers into the storage portion; and a relay control portion which, if there is a delay on writing the object by the write control portion, transmits a suspension request to the distributed object management server for suspending transmission of the object directed to an apparatus in question and which, if the delay is resolved, transmits a resume request to the distributed object management server for resuming the transmission, and the distributed object management server includes: a completion information management portion which stores a relay state of the object server which has transmitted the suspension request and which stores information of the object which should be transmitted again when the transmission to the object server that has transmitted the suspension request is resumed; and a relay control portion which requests other object server transmitting the object to the object server that has transmitted the suspension request to temporally exclude the object server that has transmitted the suspension request from a copying operation of the object and which, if the resume request is received from the object server that has transmitted the suspension request, requests said other object server which has been transmitting the object before the suspension request to the object server that has transmitted the suspension request to include the object server that has transmitted the suspension request in the copying operation of the object.

The above-described distributed object management server includes: a completion information management portion which stores a relay state of an object server which has transmitted the suspension request and which stores information of an object which should be transmitted again when transmission to the object server that has transmitted the suspension request is resumed; and a relay control portion which, when receiving the suspension request from the object server, requests other object server transmitting the object to the object server that has transmitted the suspension request to temporally exclude the object server that has transmitted the suspension request from a copying operation of the object and which, when the resume request is received from the object server, requests said other object server which has been transmitting the object before the suspension request to the object server that has transmitted the suspension request to include the object server that has transmitted the suspension request in the copying operation of the object.

The above-described distributed management method of a distributed management system including at least an object server which copies an object and a distributed object management server, the distributed object management method includes: a step of, when a suspension request is received from the object server, requesting other object server transmitting the object to the object server which has transmitted the suspension request to temporally exclude the object server which has transmitted the suspension request from a copying operation of the object; and a step of, when a resume request is received from the object server which has transmitted the suspension request, requesting said other object server which has been transmitting the object before the suspension request to the object server which has transmitted the suspension request to include the object server which has transmitted the resume request in the copying operation of the object again.

Other solution is a computer program stored in a computer readable recording medium of a distributed management system which includes at least an object server which copies an object and a distributed object management server, the computer program including instructions for executing steps of: when the distributed object management server receives a suspension request is received from the object server, requesting other object server transmitting the object to the object server which has transmitted the suspension request to temporally exclude the object server which has transmitted the suspension request from a copying operation of the object; and when a resume request is received from the object server which has transmitted the suspension request, requesting said other object server which has been transmitting the object before the suspension request to the object server which has transmitted the suspension request to include the object server which has transmitted the resume request in the copying operation of the object again.

As clearly described in the above descriptions, in accordance with the present invention, portions which have delays are skipped, and after firstly transmitting the object, the skipped portions due to the delay are complemented by the object servers each other. Therefore, skipped portions due to delays can be complemented in parallel. In accordance with such a manner, it is possible to reduce delays because delays in writing operations on the object databases of the object servers are overlapped.

Further, in the present invention, a state of generating operations of copies of the object data are monitored, and the object is firstly transmitted while portions which have delays are temporally skipped. Further, when the objects are transmitted, or after this and when n (integer and 1 or more) of the object servers finish the copying operations by complementing the skipped portions caused by delays between the object servers, information indicating the end of the copying operations to a client terminal, and the rest of the complementing operations are conducted as background operations regardless of the client terminal. Therefore, it is possible to control or manage a tradeoff relationship between a performance and reliability.

BEST MODE FOR CARRYING OUT THE INVENTION

Hereinafter, the present invention is described by showing embodiments of the invention. Embodiments shown below are not limitations on the present invention, and all combinations of constitutional elements described in the embodiments are not necessarily used in solutions of the present invention.

Figure 1:
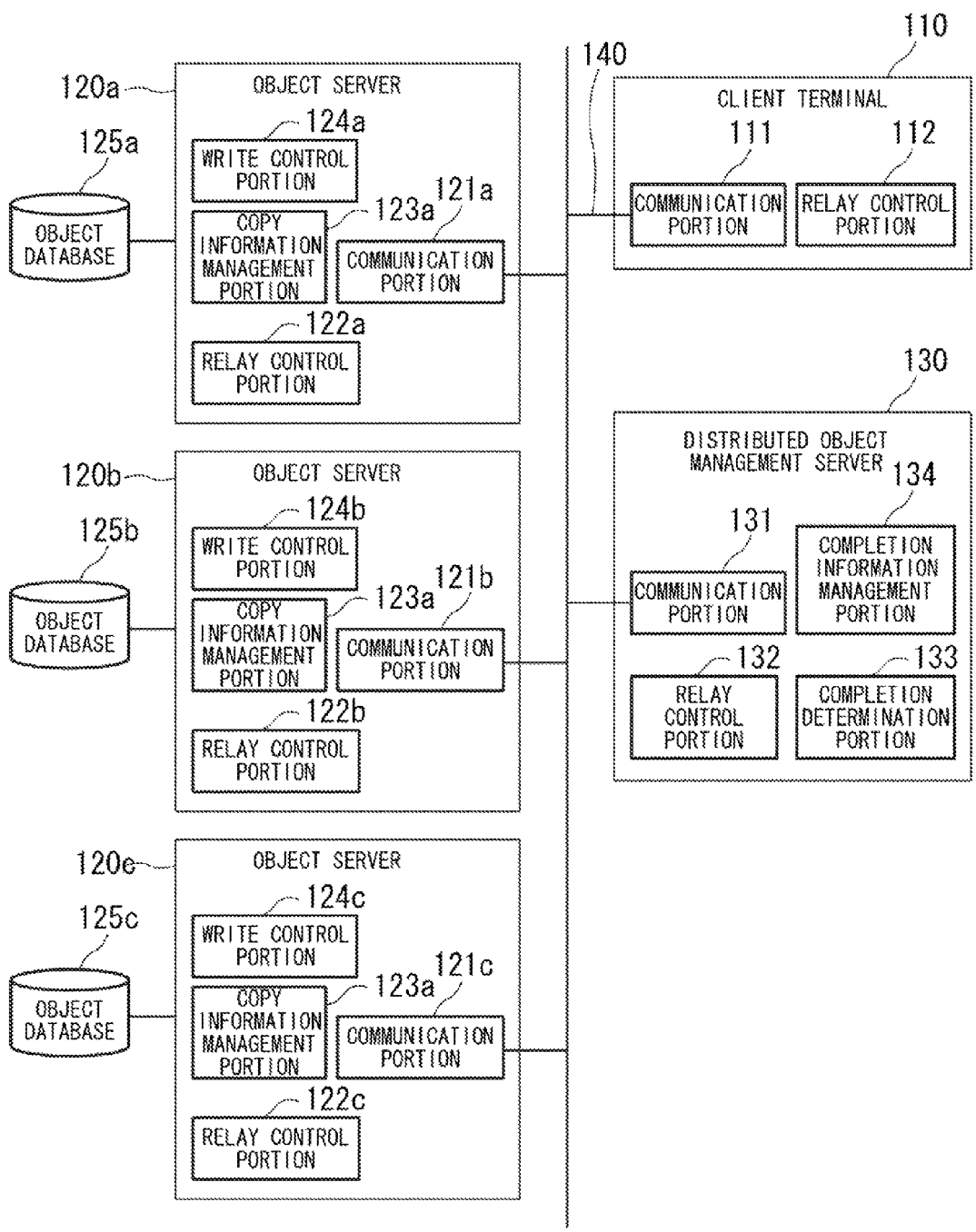
FIG. 1 is an outline drawing of a device constitution of a distributed object system 100.
Figure 2:
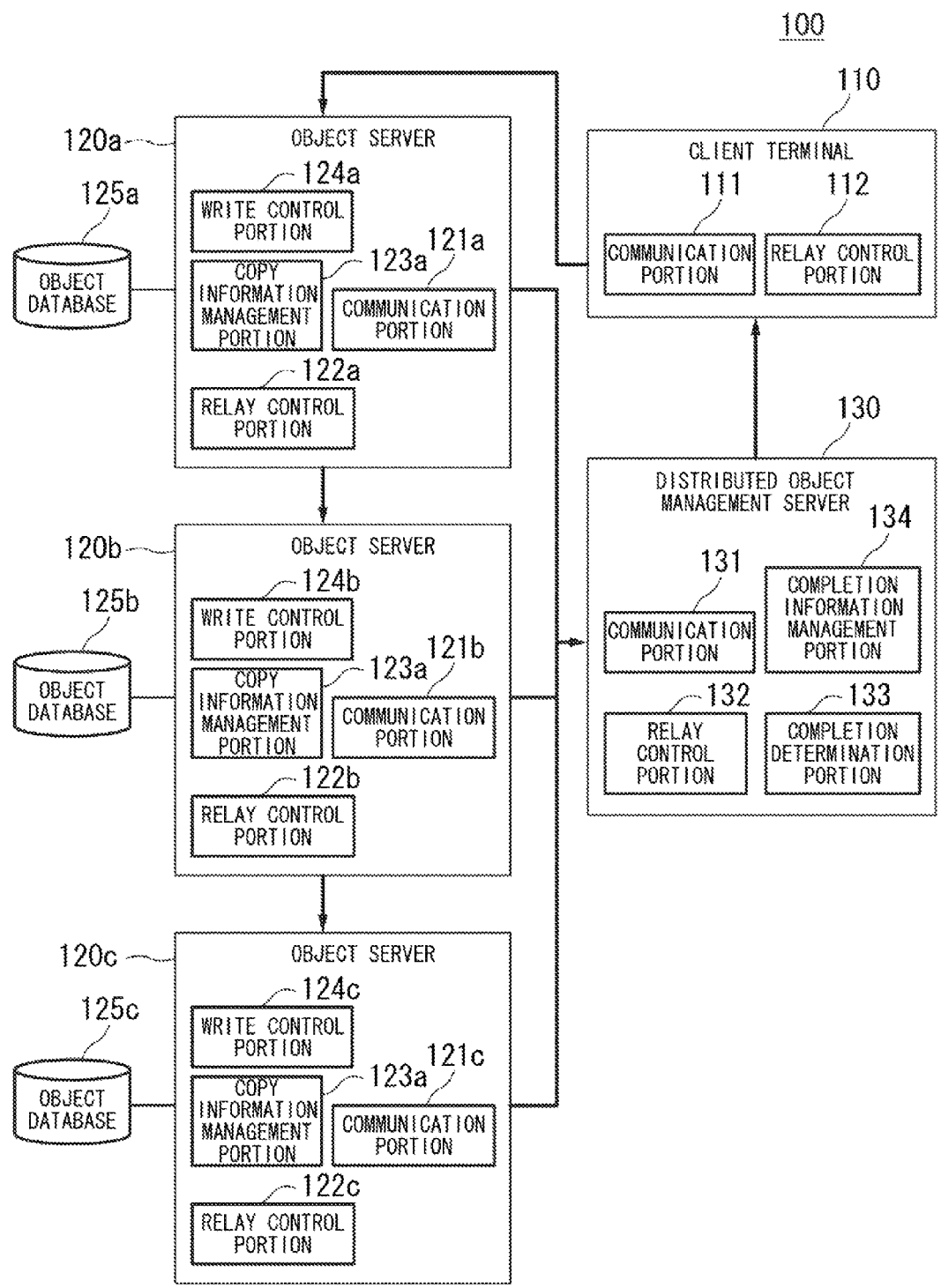
FIG. 2 is an outline operation drawing of the distributed object system 100.

FIG. 1 is an outline drawing of a device constitution of a distributed object system 100. FIG. 2 is an outline operation drawing of the distributed object system 100.

The distributed object system 100 includes a client terminal 110 which transmits an object, object servers 120a-120c which copy the object and a distributed object management server 130.

The client terminal 110, object servers 120a-120c and a distributed object management server 130 communicate to each other via a network 140. From the object servers 120a-120c via the network 140, the object management server 130 receives the status information which includes relay suspension information and relay resume information and which relates to, for example, a state that affects on a copying operation of the object.

The object server 120a receives the object from the client terminal 110. After this, the object server 120a copies the received object. The object server 120b receives the object from the object server 120a. After this, the object server 120b copies the received object. The object server 120c receives the object from the object server 120b. After this, the object server 120c copies the received object.

Each of object servers 120a-120c correspondingly includes communication portions 121a-201c, relay control portions 122a-202c, copy information management portions 123a-203c and write control portion 124a-204c. Further, each of object servers 120a-120c correspondingly includes object databases 125a-220c.

The relay portions 122a-202c ask a next object server in which the object will be copied of the copy information management portions 123a-203c and relay the object to the replied object server which is a relay destination. Further, when relaying the object, simultaneously the write control portions 124a-204c writes the object into the object database 125a-220c.

Here, if there is a delay while writing, the relay control portions 122a-122c transmits a relay suspension request to the distributed object management server 130 via the communication portions 121a-201c. The relay suspension request includes information which is necessary for resuming the relay operation. After this, when it becomes possible again to conduct the writing operation, the relay control portions 122a-122c transmit a relay resume request to the distributed object management server 130. Further, when the receiving or writing operation on the object is finished, 122a- 122c transmits write complete information to the distributed object management server 130.

The distributed object management server 130 includes a communication portion 131, a completion determination portion 133 and a completion information management portion 134. With regard to the relay suspension request, the relay control portion 132 records a state of suspension into the completion information control portion 134 and transmits information to other object servers for requesting to exclude an object server to which the relay operation is suspended from the copying operation of the object. Further, with regard to the relay resume request, a state of suspension of the relay operation is read from the completion information management portion 134, and information is transmitted to other object servers to request including of the server which issued the relay resume request in the copying operation of the object.

When receiving the write complete information from the object server, the relay control portion 132 issues a query to the completion determination portion 133 for asking whether or not it is possible to reply the completion information of copying the object to the client terminal 110. The completion determination portion 133 checks whether or not a number of the object servers which completed the copying operations reached a target number of the object servers that has finished the copying operations, and transmits the checking results to the relay control portion 132. When the completion determination portion 133 replies the write complete information, the relay control portion 132 transmits information indicating completion of copying to the client terminal 110 via the communication portion 131.

The client terminal 110 includes a relay control portion 112 and a communication portion 111. The relay control portion 112 is used by or called from an application program on the client terminal 110 and transmits a write request of the object to the object servers 120a-120c via the communication portion 111.

The application program executed on the client terminal 110 connects to the object server by using the relay control portion 112 and the communication portion 111. After establishing a connection to the object server, the client terminal 110 starts transmitting the object. The client terminal 110 may transmit, for example, a transaction ID, an object ID and transmission destination client terminal information as information necessary for a transmission management of the object. In addition it is possible to transmit information to the object management server 130 with regard to a number of copies of the object.

Figure 3:
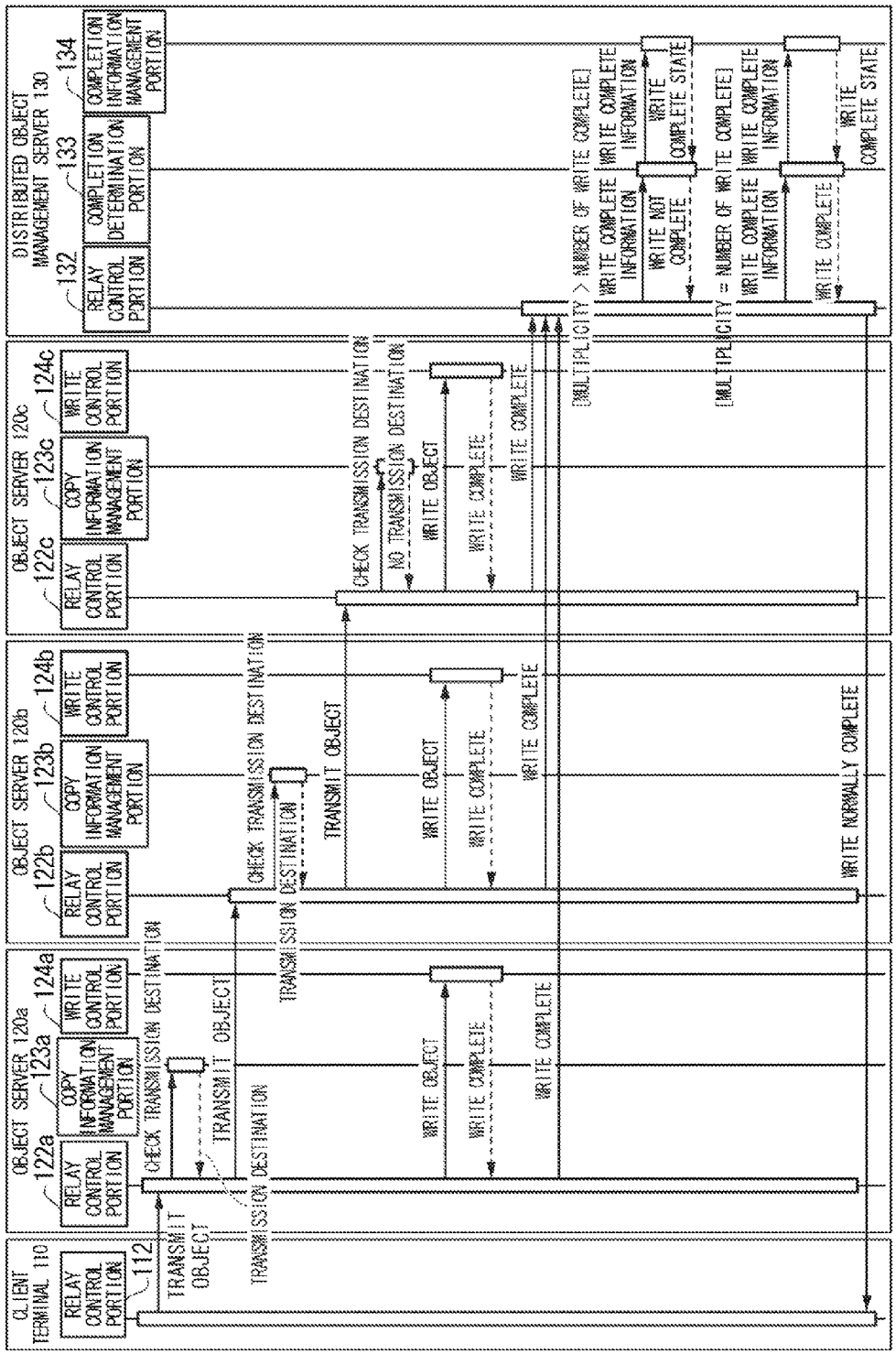
FIG. 3 is a sequence chart of operations of the distributed object system 100 in a case in which there is no operation delay.

FIG. 3 is a sequence chart of operations of the distributed object system 100 in a case in which there is no operation delay.

When the object is transmitted from the client terminal 110, an operation of writing the object is sequentially conducted in an order of the object server 120a, the object server 120b and finally the object server 120c.

When a writing operation of the object is completed, each of the object servers 120a-120c transmits information indicating the end of writing to the distributed object management server 130. When a number of the object servers which had transmitted such completion information reaches a predetermined number or more, the distributed object management server 130 transmits information indicating normal completion of writing to the client terminal 110.

Figure 4:
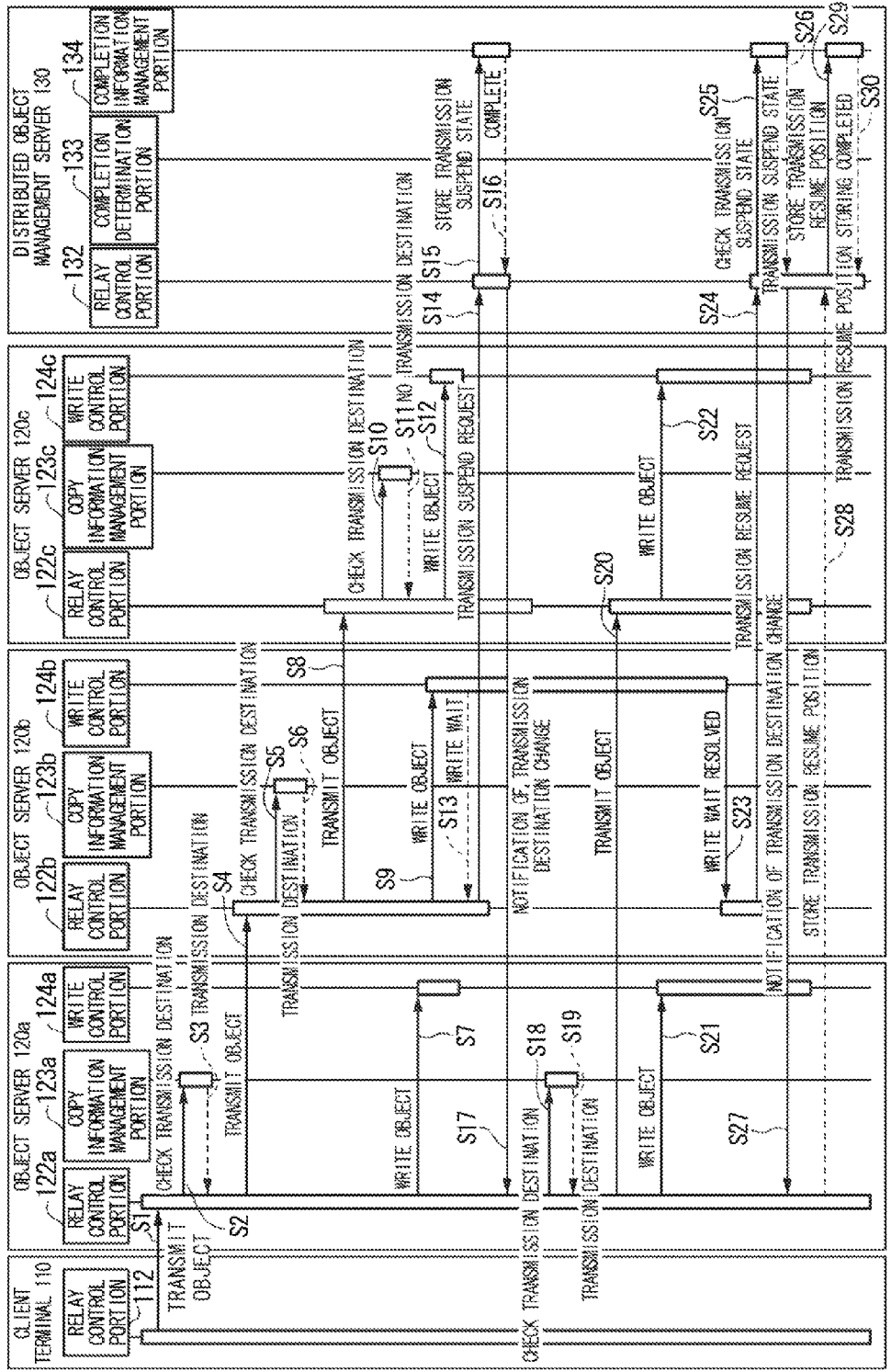
FIG. 4 is a sequence chart of operations of the distributed object system 100 in a case in which there are operation delays.
Figure 5:
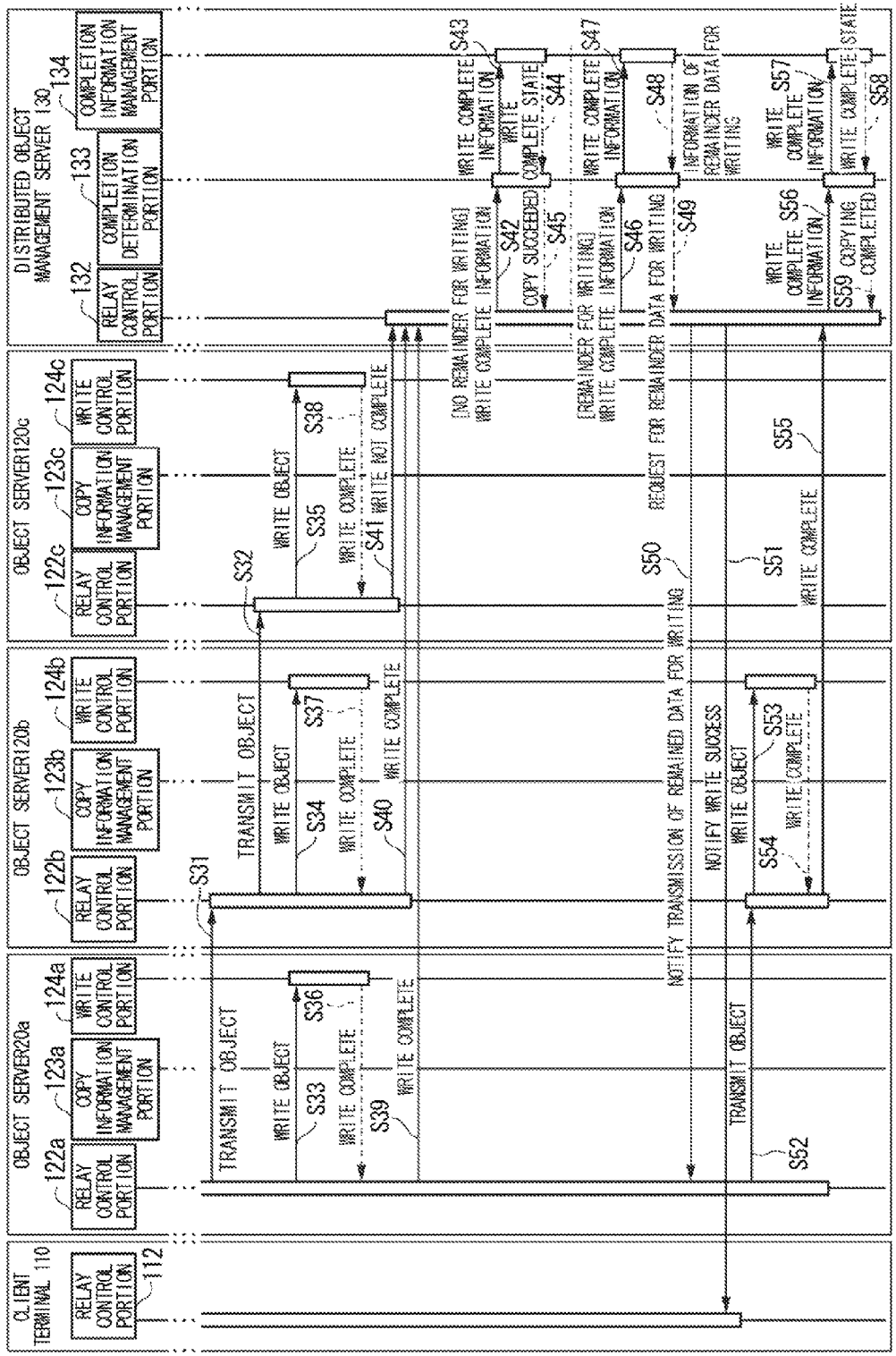
FIG. 5 is a sequence chart of operations of the distributed object system 100 in a case in which there are operation delays.

FIGS. 4 and 5 are sequence charts of operations of the distributed object system 100 in a case in which there are operation delays.

Here, in reference to FIGS. 4 and 5, operations of the distributed object system 100 are explained in a case in which there are operation delays. It should be noted that in this example, it is determined that operations are successful if copies are generated at least at two object servers, and copies are generated at three object servers in a completely finished case.

First, the object server 120a receives the object from the client terminal 110 (S1). The relay control portion 122a issues a query to the copy information management portion 123a for checking the object server which is a destination of a next relay operation for copying (S2). After receiving the information of the object server which is a destination for a next copying operation (S3), the relay control portion 122a writes the object in the object database 125a by using the write control portion 124a (S7) while relaying the object to the object server based on the received information (S4).

The object server 120b checks the object server which is a destination of a next relay operation for copying (S5) by using the copy information management portion 123b, and receives the information of the object server which is a destination for a next copying operation (S6). The object is written in the object database 125b by using the write control portion 124b (S9) while relaying the object to the object server based on the information received at S6 (S8).

The object server 120c, after checking the object server which is a destination of a next relay operation for copying (S10) by using the copy information management portion 123c, and after detecting no object server which is a destination for a next copying operation (S11), the object is written in the object database 125c by using the write control portion 124c (S12).

Here, if the write control portion 124b is in a state of waiting for writing due to, for example, increased load of a CPU, information which indicates the write wait is sent to the relay control portion 122b (S13). The relay control portion 122b issues a request to the distributed object management server 130 for temporally suspending the relay operation of the object to the object server 120b (S14). Here, the request for temporally suspending the relay operation of the object is transmitted together with information which is necessary for a relay control of the object, for example, a transaction ID, an object ID, relay source object server information, and relayed offset information of the object.

The relay control portion 132 requests the completion information management portion 134 for storing the information with regard to, for example, the object on which the writing operation is suspended by the object server 120b that transmitted the suspension request (S15), and when the end of storing operation of the information is notified (S16), the relay control portion 132 transmits information to the object server 120a for requesting excluding the object server 120b from relay destination targets (S17). It should be noted that it is not a problem for transmission of such information whether by using a unicast or by using a broadcast.

The relay control portion 122a which has received the information indicating a change of a relay destination issues a query again to the copy information management portion 123a for requesting the object server which is a next relay destination (S19). Here, it is possible to omit S18 and S19 if relay destination change information S16 includes the next relay destination.

The relay control portion 122a writes the object in the object database 125a by using the write control portion 124a (S21) while relaying the object to the object server which is previously checked (S20). Here, an offset for transmitting the object can be after a portion which has been-transmitted. The object server 120c writes the received object (S22).

When a factor causing the write wait for writing into the object database 125b is resolved, the write control portion 124b transmits information to the relay control portion 122b that indicates end of the write wait (S23). The relay control portion 122b receives the information and requests the distributed object management server 130 to resume the relay operation (S24). Here, the relay resume request includes information necessary for a relay operation of the object, for example, a transaction ID and an object ID.

The relay control portion 302 issues a request to the completion information management portion 134 for information necessary for resuming the relay operation (S25), and based on the received information (S26), the relay control portion 302 transmits information for requesting the object server 120a to resume the relay operation to the object server 120b (S27). The object server 120a transmits the object information and the like to the distributed object management server 130 (S28). The relay control portion 132 records the object information and the like in the completion information management portion 134 with regard to the object on which the relay operation is going to be resumed and receives completion information of recording (S30).

While relaying the object to the object server 120b as described in S27 (S31), the relay control portion 122a writes the object into the object database 125a by using the write control portion 124a (S33). While relaying the object to the object server 120c (S32), the object server 120b writes the object into the object database 125b by using the write control portion 124b (S34). The object server 120c writes the object into the object database 125c by using the write control portion 124c (S35).

When each of the write control portions 124a-204c finishes writing operations on corresponding object databases 125a-220c, each of the write control portions 124a-204c sends information indicating the end of writing to corresponding relay control portions 122a-202c (S36, S37 and S38). After receiving the information indicating the end of writing, each of the relay control portions 122a-202c transmits information indicating the end of writing to the distributed object server 130 (S39, S40 and S41).

When receiving the information indicating the end of writing, the relay control portion 132 transmits information to the completion determination portion 133 with regard to the object server which has finished the writing operation (S42 and S46). By using the completion information management portion 134, the completion determination portion 133 checks whether or not there is a remainder of the object which is nor written yet and which is caused by the object server that completed writing and suspended the relay (S43 and S47). Here, there is a difference in an operation that depends on whether or not the object server which has transmitted the information indicating the end of writing has suspended the relay operation First, a case is explained in which the distributed object management server 130 receives the information indicating the end of writing from the object server 120a or 120c. Because there is no remainder of writing, the completion information management portion 134 replies information for notifying such no remainder to the completion determination portion 133 (S44). The completion determination portion 133 counts up because it is assumed that the object server 120a or 120c has completed copying and transmits the completion information of copying to the relay control portion 132 based on whether or not a predetermined number of copies are generated.

Here, it is assumed that the copies are generated at least at a pair of object servers, and therefore, information directed to the client terminal 110 indicating that a writing operation has been successfully completed is sent to the relay control portion 132 (S45). Here, various solutions can be applied to the information indicating, for example, how many copies should be generated, that are, for example, the information is recorded at the distributed object management server beforehand, and/or the information is transmitted from the client terminal 110 or the object server when or after starting the copying operation. The relay control portion 132 transmits copy success information indicating that the writing operation has been successful to the client terminal 110 (S51). The client terminal is released from the writing operation when receiving the copy success information at S51.

Hereinafter, a case is explained in which the object management server 130 receives the information indicating the end of writing from the object server 120. There is a remainder of the write operation because the object server 120b has not been received the data of the object from S14 to S24. Therefore, information is replied to the completion determination portion 133 that are, for example, the offset/amount of data of the object and information indicating which object server has the data, and that are necessary for complementing the remainder of the writing operation (S48).

The completion determination portion 133 transmits information to the relay control portion 132 that notifies the remainder of copying and that is necessary for complementing the remainder (S49). Based on the information necessary for complementing, the relay control portion 132 determines the object server 120a as an object server which is a complementation source, transmits information for requesting the object server 120a to complement the object of the object server 120b and transmits necessary information at the same time (S50).

The object server 120a receives complementation information of the object with regard to the object server 120b from the distributed object management server 130 and transmits missing portions of the object to the object server 120b (S52). The object server 120b writes the object in the object database 125b by using the write control portion 124b (S53).

When the write control portion 124b finishes the writing operation on corresponding object databases 125b, the write control portion 124b sends information indicating the end of writing to the relay control portion 122b (S54). After receiving the information indicating the end of writing, the relay control portion 122b transmits information indicating the end of writing to the distributed object server 130 (S55).

When receiving the information indicating the end of writing, the relay control portion 132 transmits information to the completion determination portion 133 with regard to the object server 120b which has finished the writing operation (S56). By using the completion information management portion 134, the completion determination portion 133 checks whether or not there is a remainder of the object which is not written yet and which is caused by the object server that completed writing and suspended the relay (S57).

The data which is not received between S14 and S24 has been complemented in complementation operations of S50, S52 and S53, and therefore, a notification which indicates completion of writing is replied to the completion determination portion 133 (S58). The completion determination portion 133 counts up because it is assumed that the object server 120b has completed copying and transmits the completion information of copying to the relay control portion 132 based on whether or not a predetermined number of copies are generated. Here, the object servers 120a-120c have copied the object, and therefore, the information indicating that a writing operation has been successfully completed is sent to the relay control portion 132 (S59).

In accordance with such a manner, when generating copies of an object, an operation in which duplicated data is simultaneously relayed from one object server to multiple object servers is not conducted because the object servers 120a-120c at which the object is copied are sequentially arranged or connected, and therefore, it is possible to ease or reduce generation of a bottleneck at a network band between the object servers.

Further, the object is firstly transmitted while portions which have delays are temporally skipped. After the end of transmission of the object, portions skipped due to delays are complemented by the object servers each other, and therefore, it is possible to simultaneously complement portions skipped due to delays, and it is possible to reduce delay of writing operations on object databases.

Further, because the object is firstly transmitted while temporally skipping delayed portions, information indicating the end of copying operation is transmitted to the client terminal 110 at the time when finishing transmitting the object or at the time when a predetermined number of copies are generated by complementing skipped portions due to delays between the object servers afterward, and in remained complementation operations, skipped portions due to delays can be complemented in background operations regardless of the client terminal 110, due to this, it is possible to reduce the response time to the client terminal 110.

FIGS. 6-24 are drawings gradually showing multiple steps of copying an object in the distributed object system 100.

Hereinafter, multiple steps of copying the object in the distributed object system 100 are more specifically explained in reference to FIGS. 6-24. In this example, there is an assumption in that, after receiving a request for writing the object from the client terminal 110, a relay is sequentially conducted to other object servers while storing the object into an object database, and in that if there is a delay in writing the object, an object server is temporally dequeued from a sequence of a relay of the object, and the object server is enqueued again in the sequence when the delay of writing is resolved.

Further, it is assumed that, for example, a file which is written by the client terminal 110 is written as an object into the object databases which are attached to three object servers 120a-120c. In addition to such an assumption, writing operations of at least two of the object servers 120a-120c should be completed when information indicating succeed in copying operations is transmitted to the client terminal 110.

It is assumed that the object database is a storage device processing a data input/output service, and is implemented by using, for example, a magnetic disc, an optical disc and a semiconductor disc. In this example, a spindle magnetic disc with a writing speed of 100 Mbps or faster is assumed, however, it is possible to use other recording mediums in the same manner. Further, it is assumed that there is a suspension or a large delay of several seconds or sometimes tens of seconds in a writing operation on the magnetic disc due to operations by the object database. It can be supposed that a network is, for example, a fiber channel or Infini Band, and here, a LAN (local area network) with 100 Mbps is assumed.

Location information of object servers used for writing files into the object servers by the client terminal 110 can be obtained by the client terminal 110, object servers 120a-129c, the distributed object management server 130 or other client terminal. Further, it is possible for object servers 120a-120c and/or the client terminal 110 to additionally have a role of the distributed object management server 130. Here, it is assumed that the client terminal 110 writes the object into the object server 120a, and the object is copied to the object servers 120b and 120c.

Figure 6:
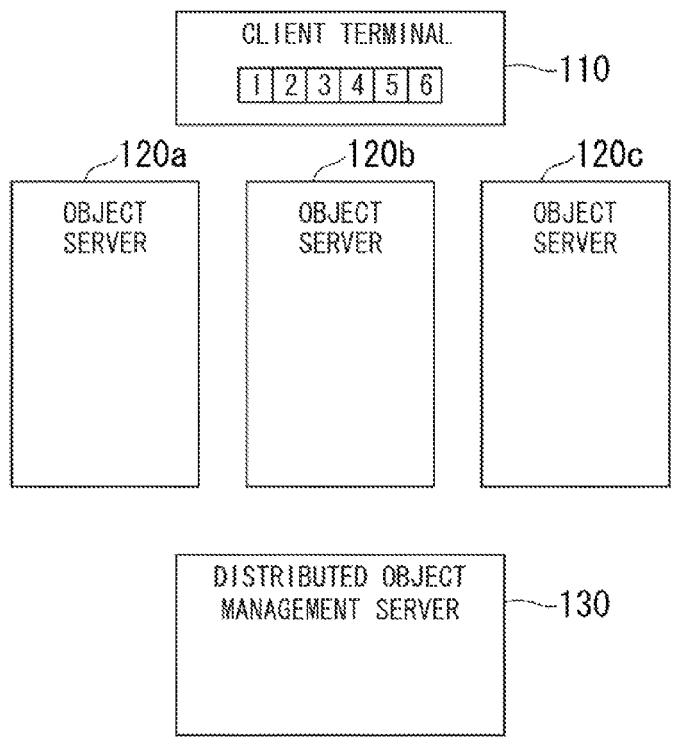
FIG. 6 is a drawing showing a first step of copying an object in the distributed object system 100.
Figure 7:
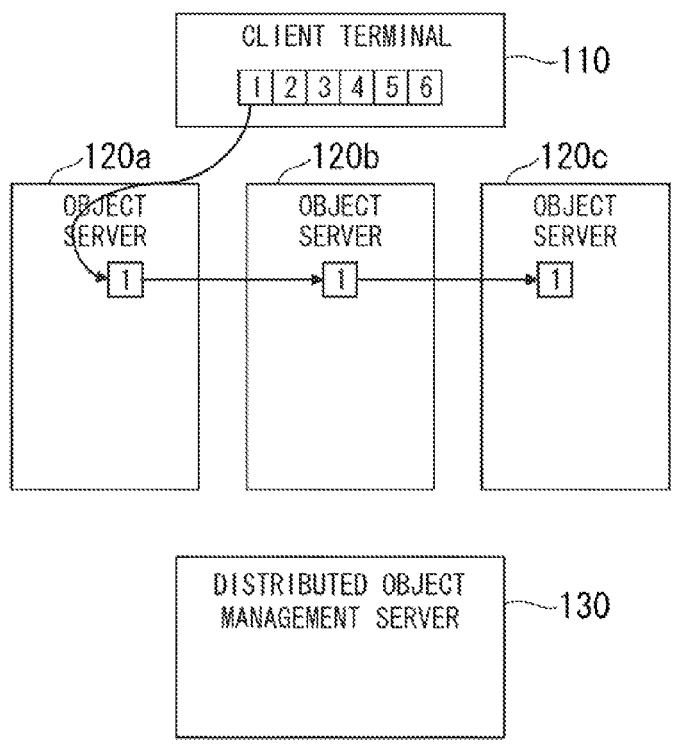
FIG. 7 is a drawing showing a second step of copying an object in the distributed object system 100.
Figure 8:
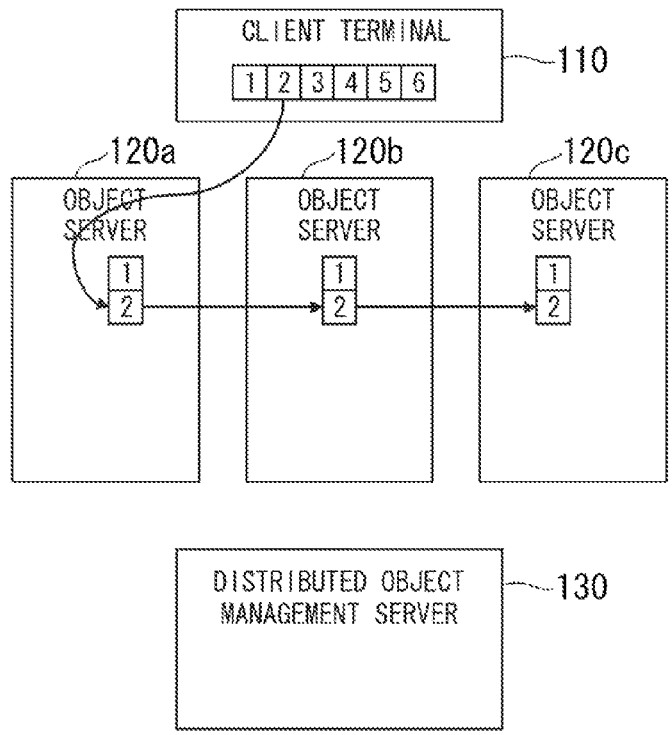
FIG. 8 is a drawing showing a third step of copying an object in the distributed object system 100.

As shown in FIGS. 6-8, the object and information with regard to a relay of the object are transmitted to the object server 120a from the client terminal 110. The object server 120a realizes other object server which is sequentially connected and determines the object server as a relay destination. Here, it is the object server 120b. Further, here, information regarding the object server of a relay destination can be obtained beforehand, or such information can be included in the information regarding relay of the object.

While writing the object into the object database which is attached to the object server 120a, the object server 120a sequentially relays information with regard to the object together with the information with regard to relay of the object to the object server 120b. In the same manner, the object server 120b relays the object to the object server 120c. Further, it is assumed that there is no object server which is a destination next to the object server 120c.

Figure 9:
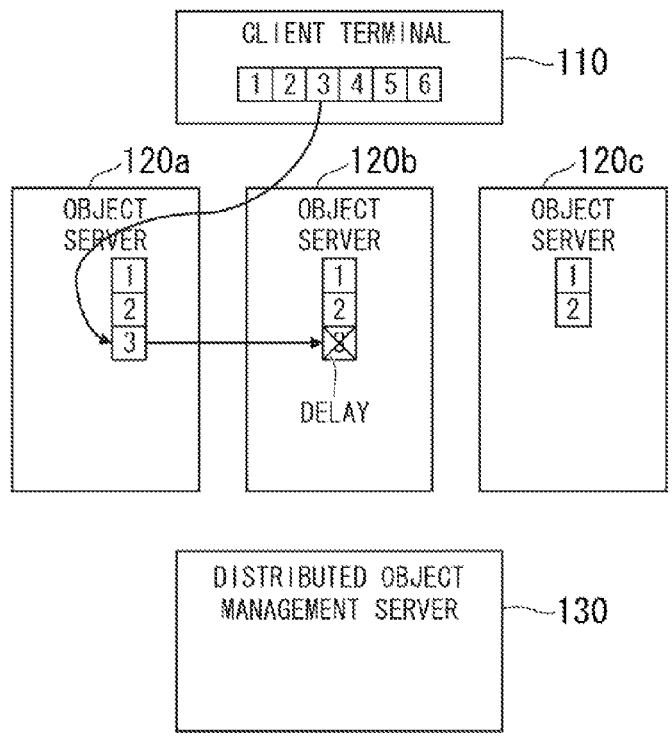
FIG. 9 is a drawing showing a fourth step of copying an object in the distributed object system 100.

Here, as shown in FIG. 9, it is assumed that a writing operation on the object database by the object server 120b is temporally suspended while relaying the object. It can be supposed that there are various reasons why the writing operation on the object server is temporally suspended, for example, an increased load on the CPU, a pressure on a main memory device and influence caused by other processes. Otherwise, such reasons can be, for example, a severe decrease of a speed of receiving the object from the object server 120a or a relay speed of the object to the object server 120c.

Figure 10:
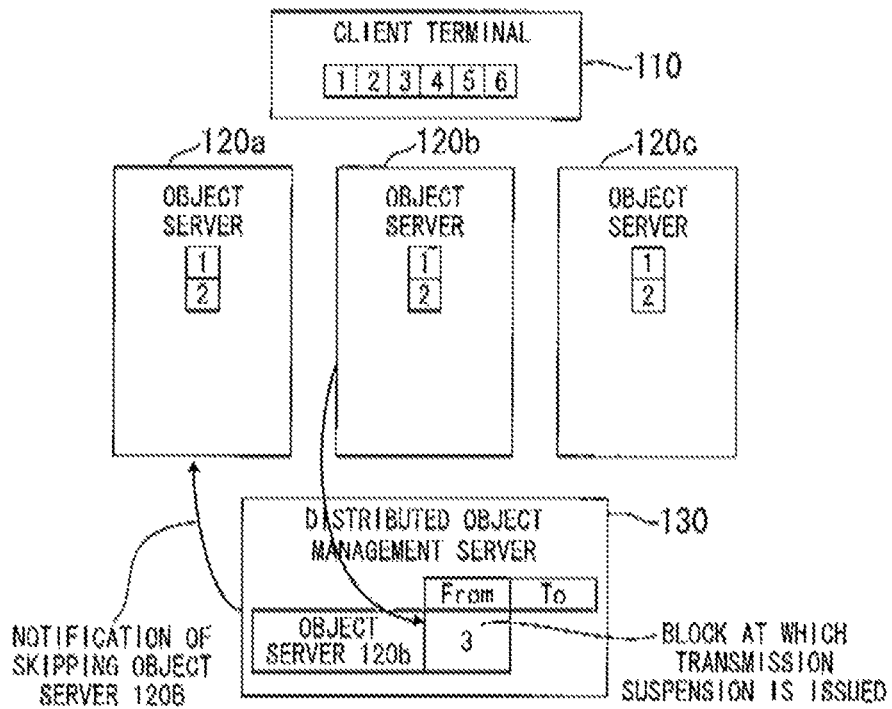
FIG. 10 is a drawing showing a fifth step of copying an object in the distributed object system 100.

As shown in FIG. 10, the object server 120b transmits information to the distributed object management server 130 for requesting a temporal suspension of a relay operation of the object to the object server 120b. The distributed object management server 130 transmits the information to the object server 120a for requesting a temporal suspension of a relay operation of the object to the object server 120b. The object server 120a receives the information and determines the object server 120c which is next to the object server 120b on a transmission path as a new relay destination of the object.

Here, a method for detecting the object server next to the object server 120b can be information included in temporal suspension information transmitted from the distributed object management server 130, information which is obtained by the object server 120a beforehand and/or a searching or retrieving operation after conducted after receiving the temporal suspension information from the distributed object management server 130. It should be noted that the object server 120a transmits information to the distributed object management server 130 afterward that is necessary for complementing the missing portions of the relay operation to the object server 120b. Such information can be, for example, offset information of the transmitted object to the objects server 120b, however, it is possible to use any information by which the missing portions can be complemented later.

Figure 11:
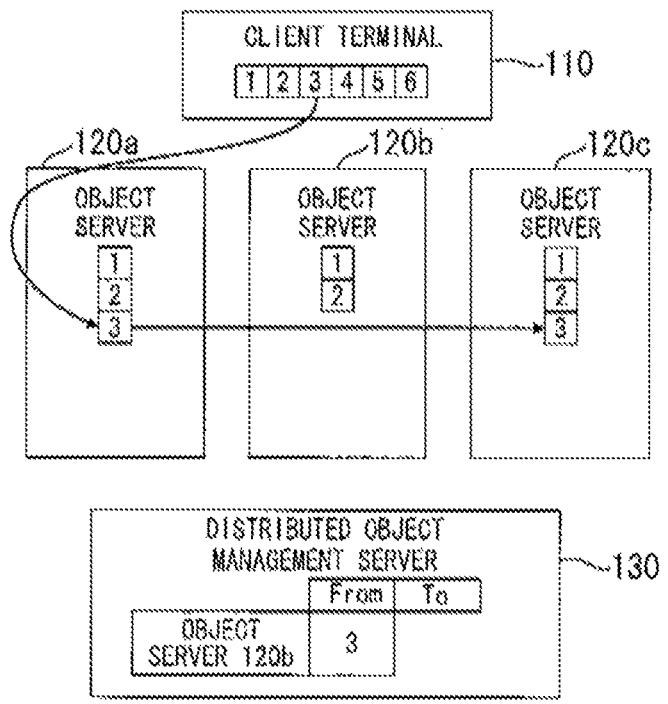
FIG. 11 is a drawing showing a sixth step of copying an object in the distributed object system 100.
Figure 12:
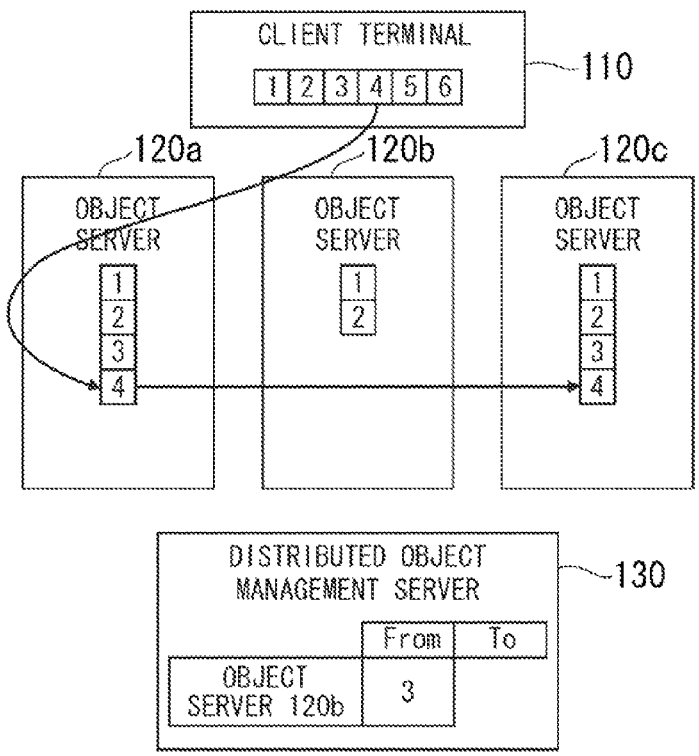
FIG. 12 is a drawing showing a seventh step of copying an object in the distributed object system 100.

As shown in FIGS. 11 and 12, the object server 120a transmits the object to the object server 120c from a position until which the object has been transmitted to the object server 120b so as to be a continuation. It should be noted that in this operation, it is possible to conduct, for example, a rewind operation of an object transmission if necessary with regard to both the object which is going to be transmitted to the object server 120c and the information with regard to relay of the object.

Figure 13:
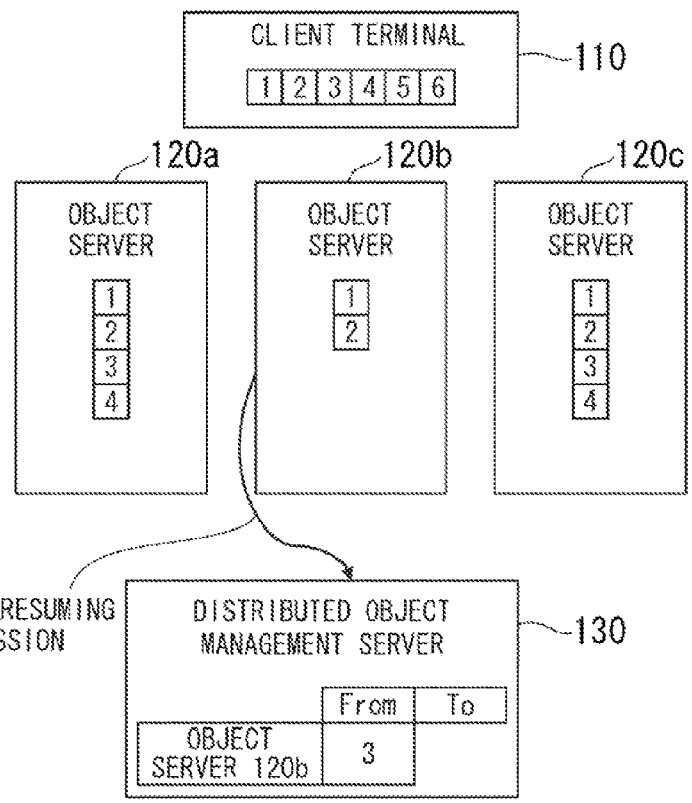
FIG. 13 is a drawing showing an eighth step of copying an object in the distributed object system 100.

As shown in FIG. 13, it is assumed that a temporal suspension on the object database of the object server 120b is resolved after a short time. The object server 120b transmits information to the distributed object management server 130 for requesting a resume of a relay operation of the object to the object server 120b.

Figure 14:
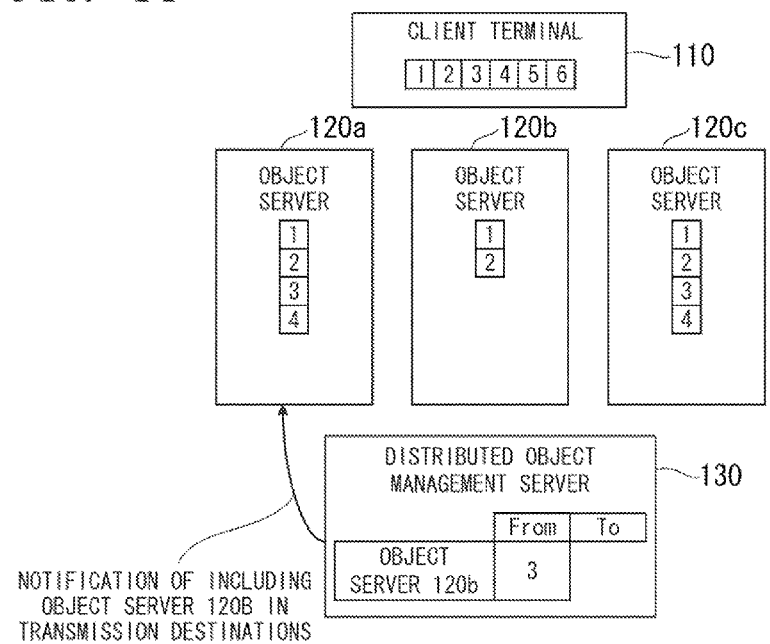
FIG. 14 is a drawing showing a ninth step of copying an object in the distributed object system 100.
Figure 15:
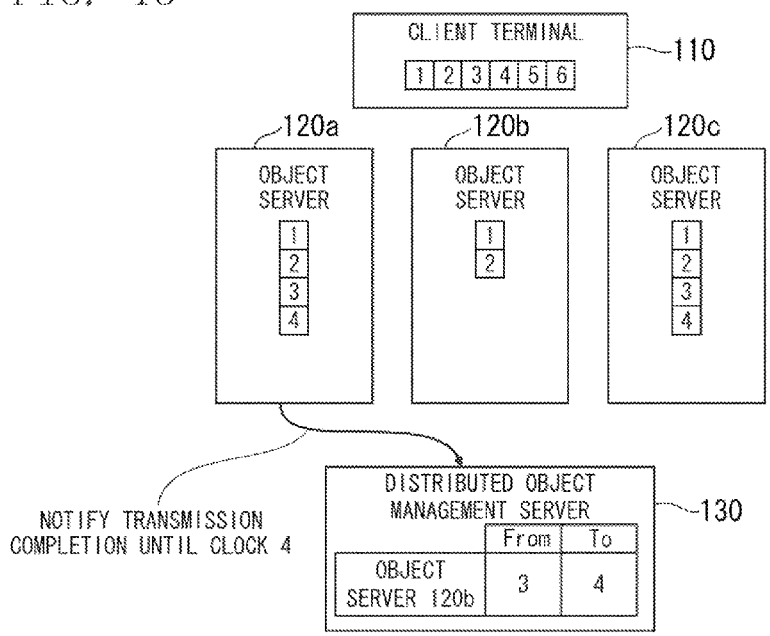
FIG. 15 is a drawing showing a tenth step of copying an object in the distributed object system 100.
Figure 16:
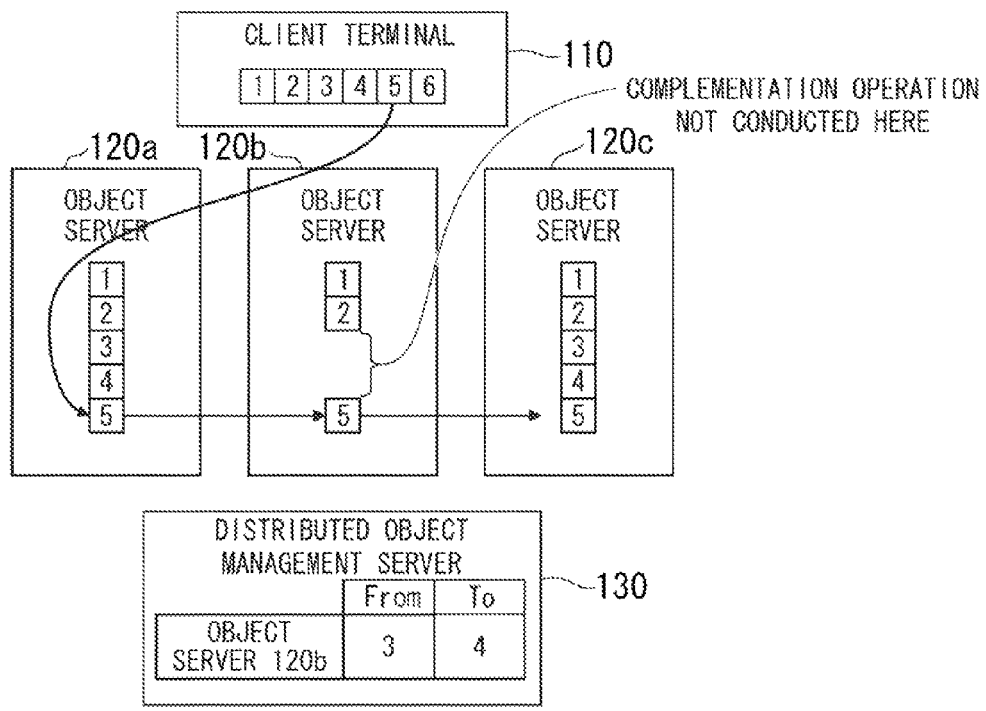
FIG. 16 is a drawing showing an eleventh step of copying an object in the distributed object system 100.
Figure 17:
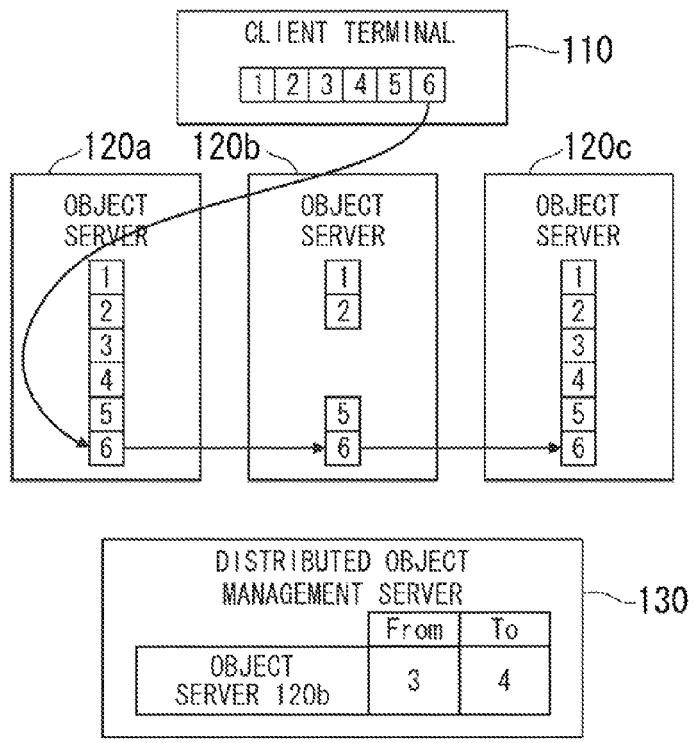
FIG. 17 is a drawing showing a twelfth step of copying an object in the distributed object system 100.
Figure 18:
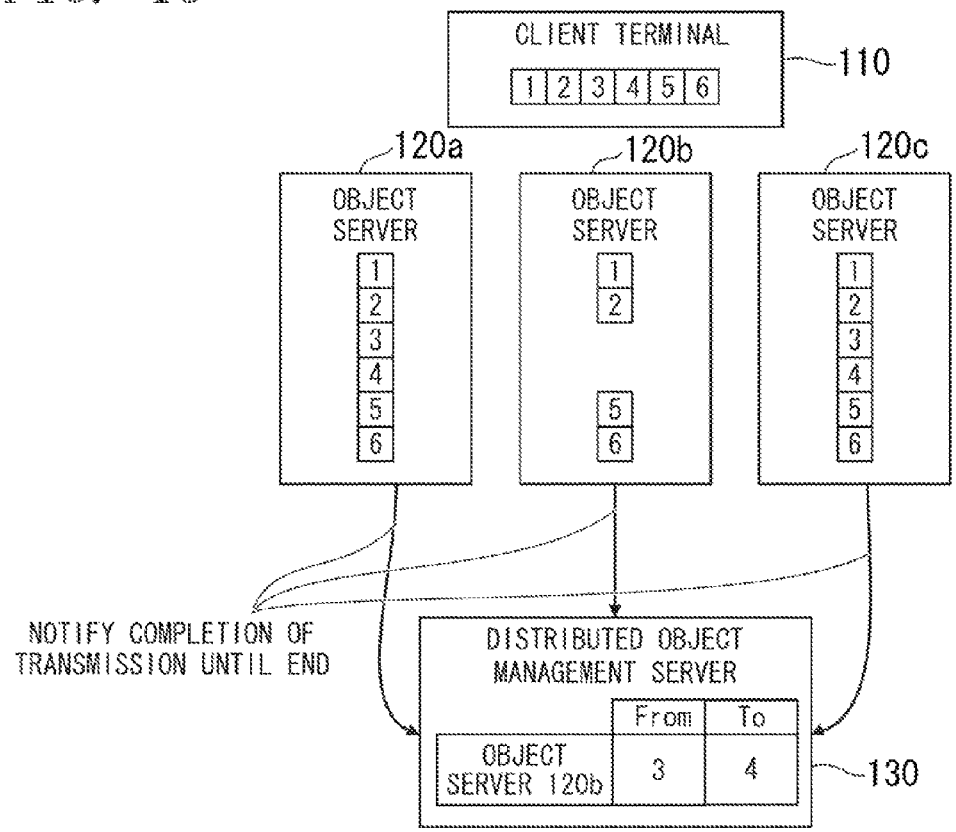
FIG. 18 is a drawing showing a thirteenth step of copying an object in the distributed object system 100.

As shown in FIG. 14, the distributed object management server 130 transmits information to the object server connected in a sequence for requesting to insert the object server 120b into the sequence of relay. Here, a position on the sequence where the object server 120b is inserted can be whether an original position before temporal suspension or an arbitrary position, however, it is necessary to avoid interruption of the relay path.

Figure 19:
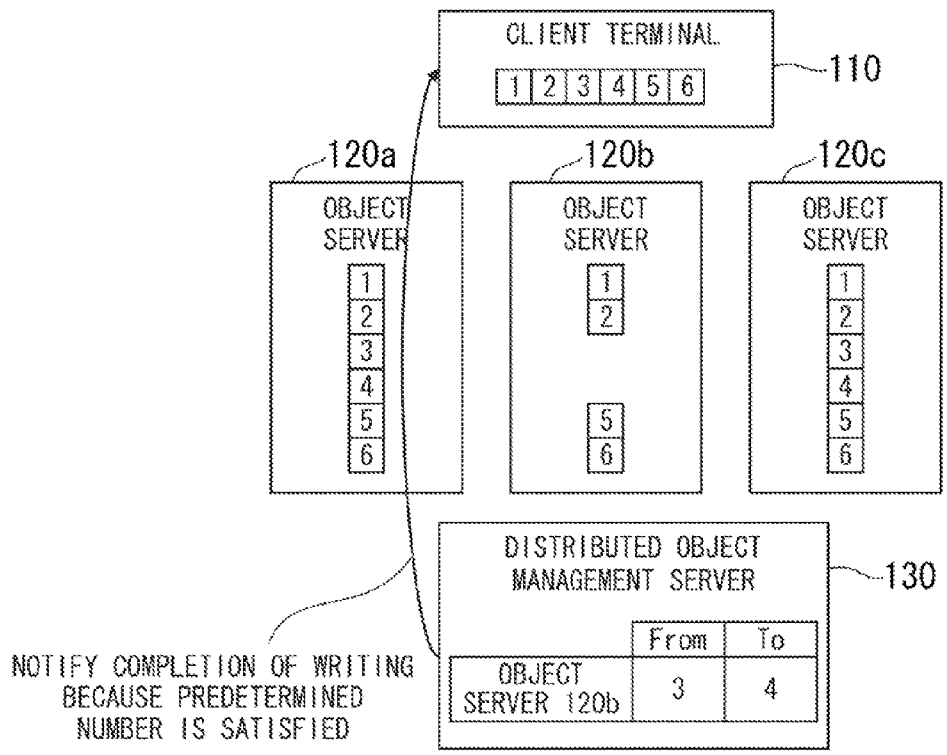
FIG. 19 is a drawing showing a fourteenth step of copying an object in the distributed object system 100.

As shown in FIGS. 15-18, after transmission of all portions of the object by the client terminal 110 and after writing of the received data into the object databases by the object servers 120a-120c, the information indicating the end of writing is transmitted to the distributed object management server 130. The distributed object management server 130 determines that the object servers 120a and 120c have all data of the object because they have not suspended the transmission. At this point, a pair of copies which are initially intended have generated at the object servers 120a and 120c, and therefore, as shown in FIG. 19, information is transmitted to the client terminal 110 that indicates success in writing.

On the other hand, the object server 120b has been temporally dequeued from transmission destinations, and therefore, it is determined that there are missing portions. The distributed object management server 130 determines missing portions in the object server 120b and selects an object server having such missing portions as a transmission source for copying. Here, the object server 120a is selected. In such a case, it is supposed that missing portions in the object server 120b are determined, for example, based on the temporal suspension information received from the object server 120a or based on the offset information with regard to the object which have transmitted to the object server 120b from the object server 120a, and missing portions can be determined by the object server 120b itself or by other object servers in accordance with a solution in which, for example, the offset information of the file is included in transmission information of the object.

Figure 20:
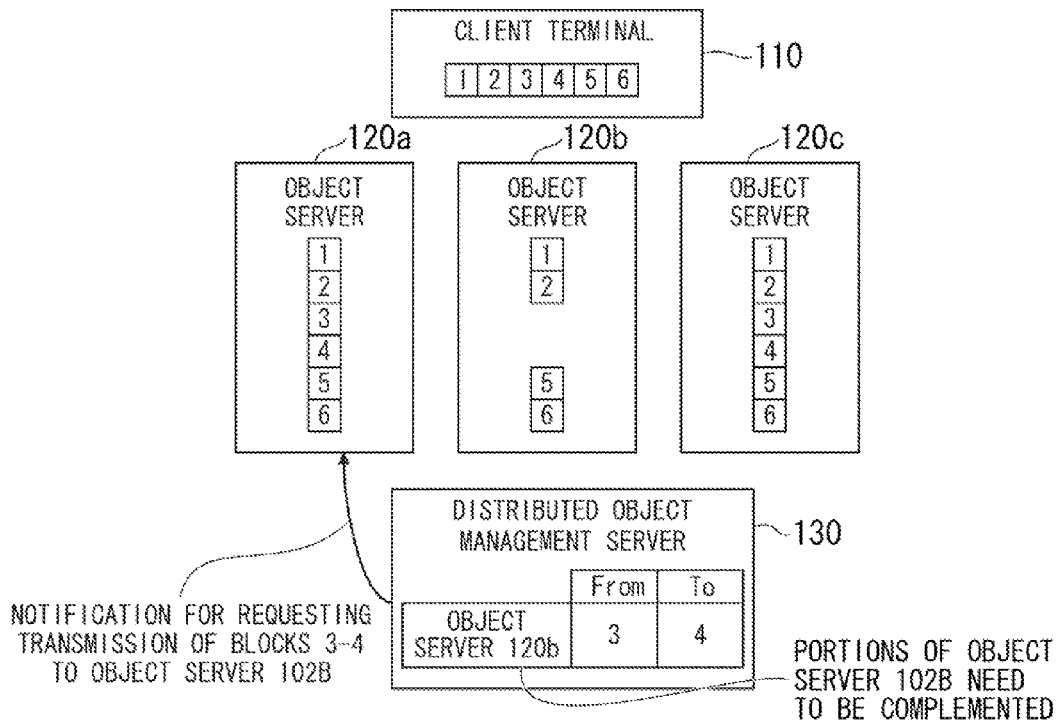
FIG. 20 is a drawing showing a fifteenth step of copying an object in the distributed object system 100.
Figure 21:
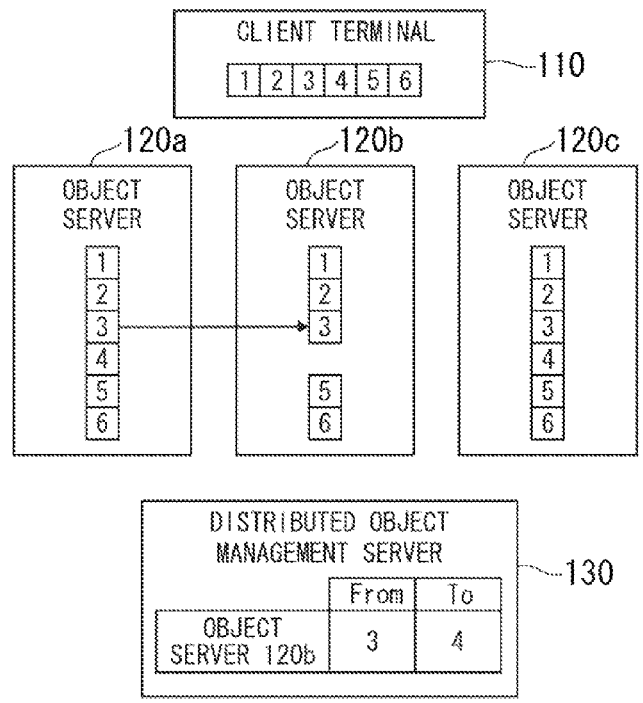
FIG. 21 is a drawing showing a sixteenth step of copying an object in the distributed object system 100.
Figure 22:
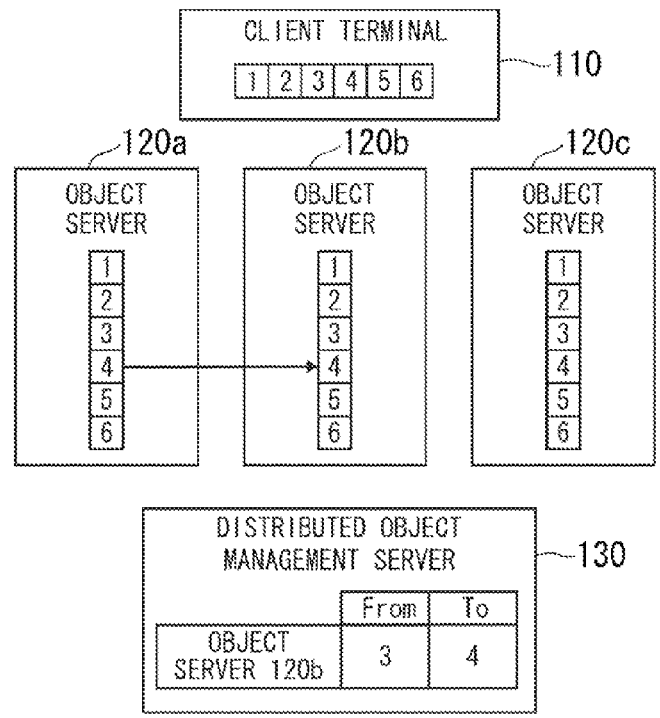
FIG. 22 is a drawing showing a seventeenth step of copying an object in the distributed object system 100.
Figure 23:
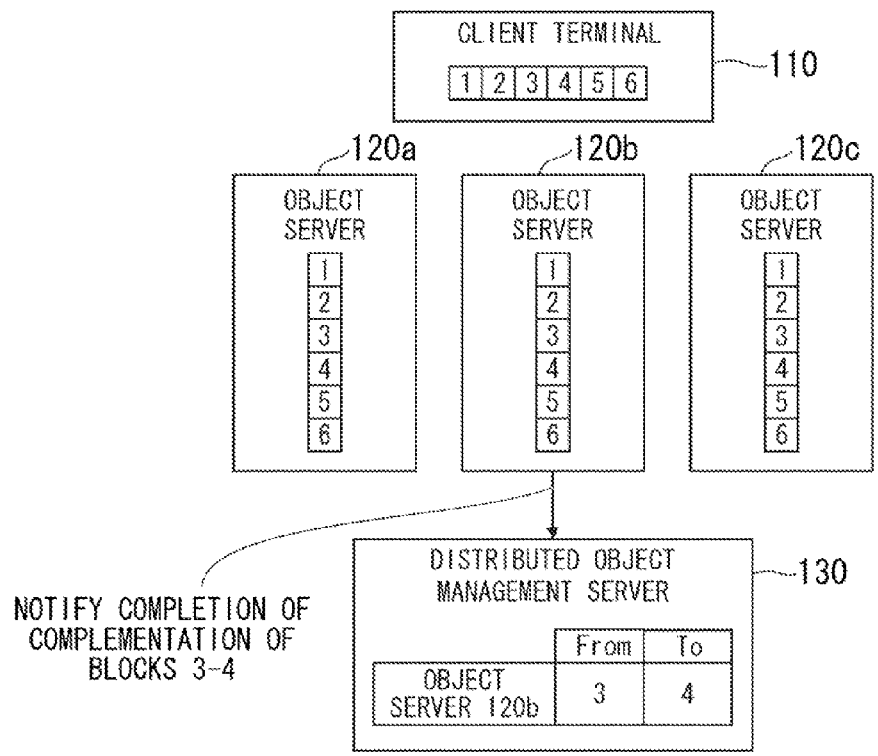
FIG. 23 is a drawing showing an eighteenth step of copying an object in the distributed object system 100.

As shown in FIG. 20, the distributed object management server 130 transmits information to the object server 120a for requesting a transmission of missing portions of the object to the object server 120b. As shown in FIGS. 21-23, when the object server 120a finished transmitting missing portions of the object of the object server 120b to the object server 120b, and when a writing operation on the object server is finished, the object server 120b transmits the information indicating the end of writing to the distributed object management server again.

Figure 24:
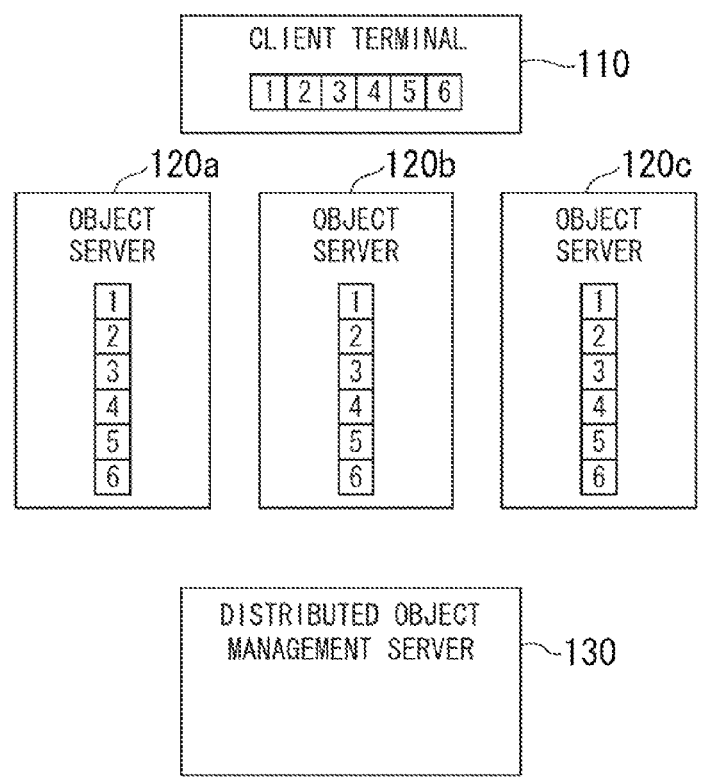
FIG. 24 is a drawing showing a nineteenth step of copying an object in the distributed object system 100.
Figure 25:
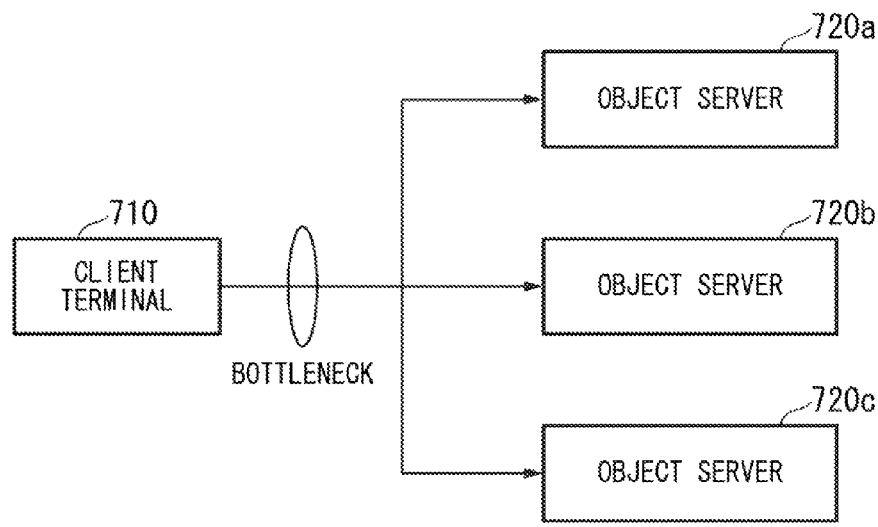
FIG. 25 is an outline drawing of a device constitution of a distributed object system 700.
Figure 26:
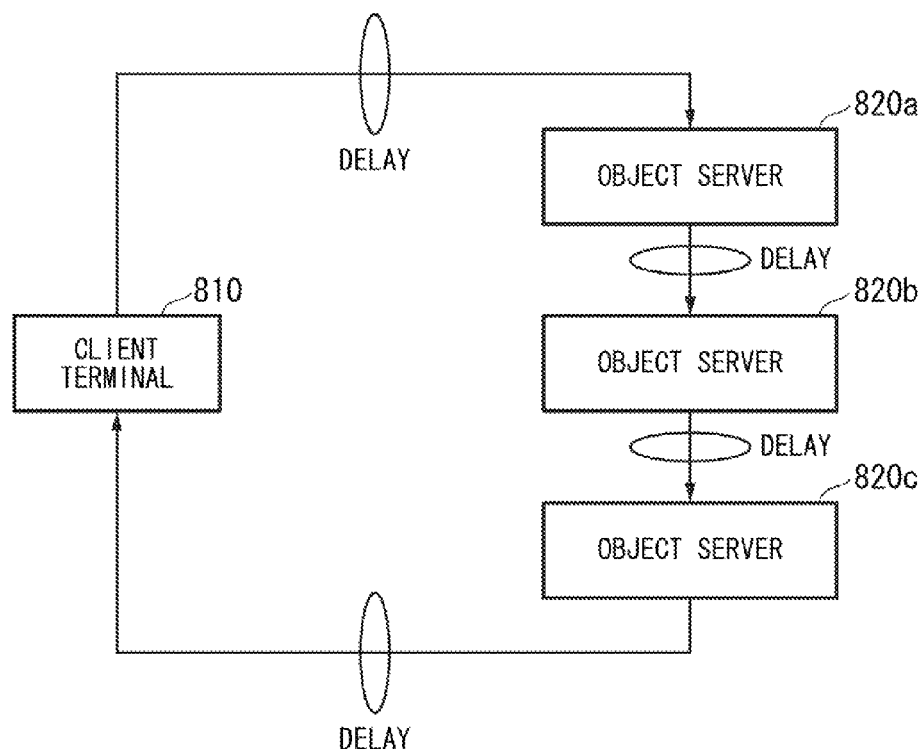
FIG. 26 is an outline drawing of a device constitution of other distributed object system 800.
Figure 27:
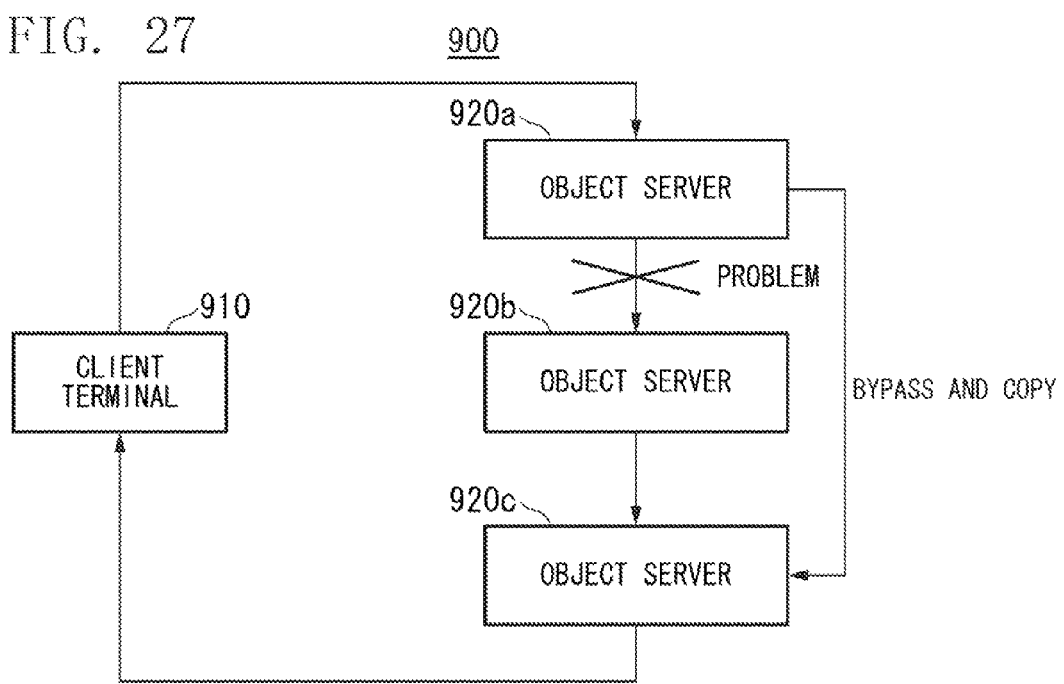
FIG. 27 is an outline drawing of a device constitution of a distributed object system 900 different from the above systems.

As shown in FIG. 24, the distributed object server 130 checks whether or not there is other missing portion, and if there is other missing portion, the distributed object server 130 transmits information for requesting a complementation operation of the missing portion again. Further, if there are multiple portions that need to be complemented, the complementation information with regard to such multiple portions can be included in transmission information used for complementation. If there is no missing portion, operations are finished.

As described above, in accordance with the above embodiment, in a system constituted from multiple object servers and an arbitrary number of client terminals, particularly in a distributed object system in which multiple object servers store copies of arbitrary objects, it is possible to reduce the time necessary for copying.

As shown above, an embodiment with regard to the present invention is described, however, description of the above embodiment is not a limitation to a technical scope of the present invention. It is understandable for a person skilled in the art that it is possible to add various modifications to the above embodiment. Embodiments to which such modifications are applied are included in the technical scope of the present invention.

For example, a number of the client terminal is one in the above description, however, this is not a limitation. Further, a number of the object servers 120a-120c is three in a constitution of the above description, however, a constitution including two, four or more than four is acceptable. Further, the distributed object management server 130 is independently provided, however, it is possible for the client terminal 110 and/or object servers 120a-120c to additionally have a role of the distributed object management server 130. In addition, a number of the distributed object management server 130 is one in the above description, however, the distributed object management server 130 can be multiple.

INDUSTRIAL APPLICABILITY

It is possible to apply the present invention to a distributed object management system which can, for example, avoid delay with regard to a request from a client terminal.

BRIEF DESCRIPTION OF THE DRAWINGS

110 ... client terminal
111 ... communication portion
112 ... relay control portion
120a ... object server
121a ... communication portion
122a ... relay control portion
123a ... copy information management portion
124a ... write control portion
125a ... object database
120b ... object server
121b ... communication portion
122b ... relay control portion
123b ... copy information management portion
124b ... write control portion
125b ... object database
120c ... object server
121c ... communication portion
122c ... relay control portion
123c ... copy information management portion
124c ... write control portion
125c ... object database
130 ... distributed object management server
131 ... communication portion
132 ... relay control portion
133 ... completion determination portion
134 ... completion information management portion
140 ... network

The invention claimed is:

1. A distributed object management system comprising:
a client terminal transmitting an object;
an object server copying the object; and
a distributed object management server communicating with the client and the object server, wherein
the client terminal comprises a relay control portion transmitting the object to the object server,
the object server comprises:
a storage portion storing the object;
a write control portion writing the object received from the client terminal or other object servers into the storage portion; and
a relay control portion, if there is a delay on writing the object by the write control portion, transmitting a suspension request to the distributed object management server for suspending transmission of the object directed to an apparatus in question and, if the delay is resolved, transmitting a resume request to the distributed object management server for resuming the transmission, and
the distributed object management server comprises:
a completion information management portion storing a relay state of the object server which has transmitted the suspension request and storing information of the object which should be transmitted again when the transmission to the object server that has transmitted the suspension request is resumed; and
a relay control portion requesting other object server transmitting the object to the object server that has transmitted the suspension request to temporally exclude the object server from a copying operation of the object and, if the resume request is received from the object server after resolving the delay in a write operation, requesting said other object server to include the object server in the copying operation of the object.

2. The distributed object management server according to claim 1, wherein
when all portions of the object transmitted from the client terminal is copied in a predetermined number of the object server, the relay control portion reads information from the completion information management portion with regard to the object to be transmitted again to a first object server which has suspended the operation, and requests a second object server to transmit the object again to the first object server.

3. The distributed object management system according to claim 1, wherein
the distributed object management server further comprising a completion determination portion which determines whether or not a successful response of a writing operation with a copying operation should be replied to the client terminal based on a number of generated copies of the object in response to an object write request from the client terminal.

4. The distributed object management system according to claim 1, wherein the object server further comprising a copy information management portion which stores order information with regard to the object servers that should copy the object.

5. The distributed object management system according to claim 1, wherein the object server further comprising a copy information management portion which calculates order information with regard to the object servers that should copy the object.

6. A method for a distributed management system, comprising:
transmitting an object by a first object server to a second object server to perform a copying operation;
in response to receiving the object by the second object server, writing the object to a storage by the second object server;
in response to a delay in writing the object to the storage by the second object server, transmitting from the second object server a suspension request to a management server for suspending transmission of the object by the first object server to the second object server;

in response to receiving the suspension request by the management server, transmitting an exclude request from the management server to the first object server to temporarily exclude the second object server from the copying operation;

in response to receiving the exclude request by the first object server, temporarily excluding the second object server from the copying operation;

in response to a resolution of the delay in writing the object to the storage by the second object server, transmitting from the second object server a resume request to the management server for resuming the transmission of the object by the first object server to the second object server;

in response to receiving the resume request by the management server, transmitting an include request from the management server to the first object server to include the second object server in the copying operation; and in response to receiving the include request by the first object server, including the second object server in the copying operation.

7. A non-transitory machine-readable medium storing computer-executable code for execution by a second object server of a distributed management system comprising a first object server, the second object server, and a management server, wherein execution of the code by the second object server causes the second object server to perform a method comprising:

receiving an object transmitted by a first object server to perform a copying operation;

in response to receiving the object, writing the object to a storage;

in response to a delay in writing the object to the storage, transmitting a suspension request to the management server for suspending transmission of the object by the first object server to the second object server, wherein in response to receiving the suspension request the management server transmits an exclude request to the first object server to temporarily exclude the second object server from the copying operation, and wherein in response to receiving the exclude request the first object server temporarily excludes the second object server from the copying operation; and in response to a resolution of the delay in writing the object to the storage, transmitting a resume request to the management server for resuming the transmission of the object by the first object server to the second object server, wherein in response to receiving the resume request the management server transmits an include request to the first object server to include the second object server in the copying operation, and wherein in response to receiving the include request the first object server includes the second object server in the copying operation.

* * * * *